(12) United States Patent
van Kuringen

(10) Patent No.: US 6,624,907 B1
(45) Date of Patent: *Sep. 23, 2003

(54) CONTROLLER FOR A PRINTING UNIT

(75) Inventor: Hendricus M. J. C. van Kuringen, Geldrop (NL)

(73) Assignee: Océ-Technologies B.V., Ma Venlo (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 799 days.

(21) Appl. No.: 08/966,453

(22) Filed: Nov. 7, 1997

(30) Foreign Application Priority Data

Nov. 8, 1996 (EP) .............................. 96117878

(51) Int. Cl.$^7$ .............................. G06F 15/00
(52) U.S. Cl. ...................... 358/1.15; 358/1.1
(58) Field of Search ................ 395/114, 112, 395/115, 116, 117, 101; 358/404, 444, 1.15, 1.13, 1.16, 1.17, 1.18, 1.1

(56) References Cited

U.S. PATENT DOCUMENTS

| | | | |
|---|---|---|---|
| 4,722,064 A | 1/1988 | Suzuki ........................ | 395/114 |
| 5,122,973 A | 6/1992 | Venner et al. ............... | 395/117 |
| 5,239,621 A | * 8/1993 | Brown, III et al. ......... | 395/115 |
| 5,511,152 A | * 4/1996 | Lai et al. ..................... | 395/115 |

* cited by examiner

Primary Examiner—Gabriel Garcia
(74) Attorney, Agent, or Firm—Birch, Stewart, Kolasch & Birch, LLP

(57) ABSTRACT

A controller for a printing unit has a standard hardware board provided with a central processing unit, an I/O-unit and a central bus system connected to the central processing unit and the I/O-unit. The I/O-unit has a connector for connecting the central bus system to a memory board that comprises one or more memory chips for storing bitmap data or compressed bitmap data of a page to be printed. The memory board has a second bus system and a memory reader connected to the memory chips via the second bus system for reading the data and transmitting them to a printer. The second bus system unloads the data read process from the central bus system, freeing it to be available more of the time for use by the CPU.

9 Claims, 2 Drawing Sheets

CONTROLLER FOR A PRINTING UNIT

FIELD OF THE INVENTION

The present invention relates to a controller for a printing unit, and more particularly to such a controller having a central or system bus and a local bus for delivering data to the printing unit.

BACKGROUND OF THE INVENTION

Known controllers for printing units have a standard hardware board provided with a central processing unit, an I/O-unit, and a central bus system connected to the central processing unit and the I/O-unit. The I/O-unit has a connector for connecting the central bus system to a memory board that comprises one or more memory chips for storing bitmap data or compressed bitmap data of a page to be printed, and a memory reader for reading the bitmap data and transmitting them to a printer.

A controller of this type is used in high-speed printing units such as laser printers or the like for supplying the image data to be printed to the print engine in the form of a pixel bit stream with a sufficient transmission rate, so that they may readily be printed. Accordingly, the controller must be capable of handling large amounts of image date in a relatively short time.

Although it is possible to provide a controller specifically designed for this purpose, manufacturing costs can be reduced by utilizing standard hardware components as they are used in normal data processing systems.

FIG. 2 illustrates an example of a prior art controller for a printing unit which has the advantage that the central processing unit (CPU) 10, the I/O-unit 12 and the central bus system 14 are formed by a standard hardware board as it is used for example in workstations. The I/O-unit 12 has a number of connectors 16, 18, 20 to which extension boards can be connected for driving peripheral devices such as memories, keyboards, or for providing interfaces to a host computer or the like. The extension boards connected to the connectors 16–20 can communicate with the central processing unit 10 and with one another via the central bus system 14.

One connector 16 is specifically designed for connecting a memory board 22 that comprises one or more memory chips 24. The memory chips 24 may for example be formed by single in-line memory modules (SIMMs) and serve as a bitmap memory. A bitmap reader 26 (memory reader) is connected to another connector 18 of the I/O-unit 12 and is capable of transmitting the read image data to the printer 28.

The data of a page to be printed are assembled in the bitmap memory under the control of the CPU 10. When a page is completed, the bitmap reader 26 gets control over the central bus system 14 and reads the bitmap data from the memory chips 24 and transmits them sequentially to the printer 28.

This conventional controller has the disadvantage that the central bus system 14 is occupied during the time when the bitmap reader 26 is operating, so that no other tasks can be performed during this time. This disadvantage is avoided in another prior art design which is illustrated in FIG. 3. Here, the bitmap reader 26 has been replaced by another processor 30, a so-called raster image processor (RIP) which can communicate with a bitmap memory 34 via a local bus 32. Thus, the bitmap memory 34 is not directly connected to the I/O-unit 12. The bitmap data are assembled and read by the raster image processor 30. As a consequence, the central bus system 14 is available for other tasks while the raster image processor 30 is operating. However, the disadvantage is that a second processor in addition to the CPU 10 is necessary.

U.S. Pat. No. 5,122,973 discloses a controller similar to that shown in FIG. 3, in which the raster image processor is used only for assembling the bitmap data and dedicated hardware is provided for reading the bitmap and transmitting the data to the printer.

SUMMARY OF THE INVENTION

It is an object of the present invention to provide a controller for a printing unit which can be based on a standard hardware board and permits more efficient use of the central bus system, without requiring a second processor.

This object is achieved by a controller for a printing unit that provides a memory board that has a second bus system directly connecting the memory chips to the memory reader.

In this context, "directly" means that the central bus system is not needed for the transmission of data from the memory chips to the memory reader, i.e. the memory chips are on the one hand linked to the central bus system in order to receive compressed or non-compressed bitmap data therefrom, and are on the other hand connected to the memory reader via a second bus system which operates independently from the central bus system. Thus, when the bitmap data are read, the central bus system is not occupied and is available for any other tasks which are to be performed by the central processing unit.

It will be noted that this advantage is achieved without requiring a second processor or any other substantial modification of the prior art systems. All that is needed is a modification of the memory board to provide it with the second bus system. From the viewpoint of the central bus system, the memory board nevertheless behaves like a normal memory board which can be fitted to the main board as usual.

In a preferred embodiment, the memory chips are formed by single in-line memory modules (SIMMs) and the bitmap reader is provided directly on the memory board together with the SIMMs.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
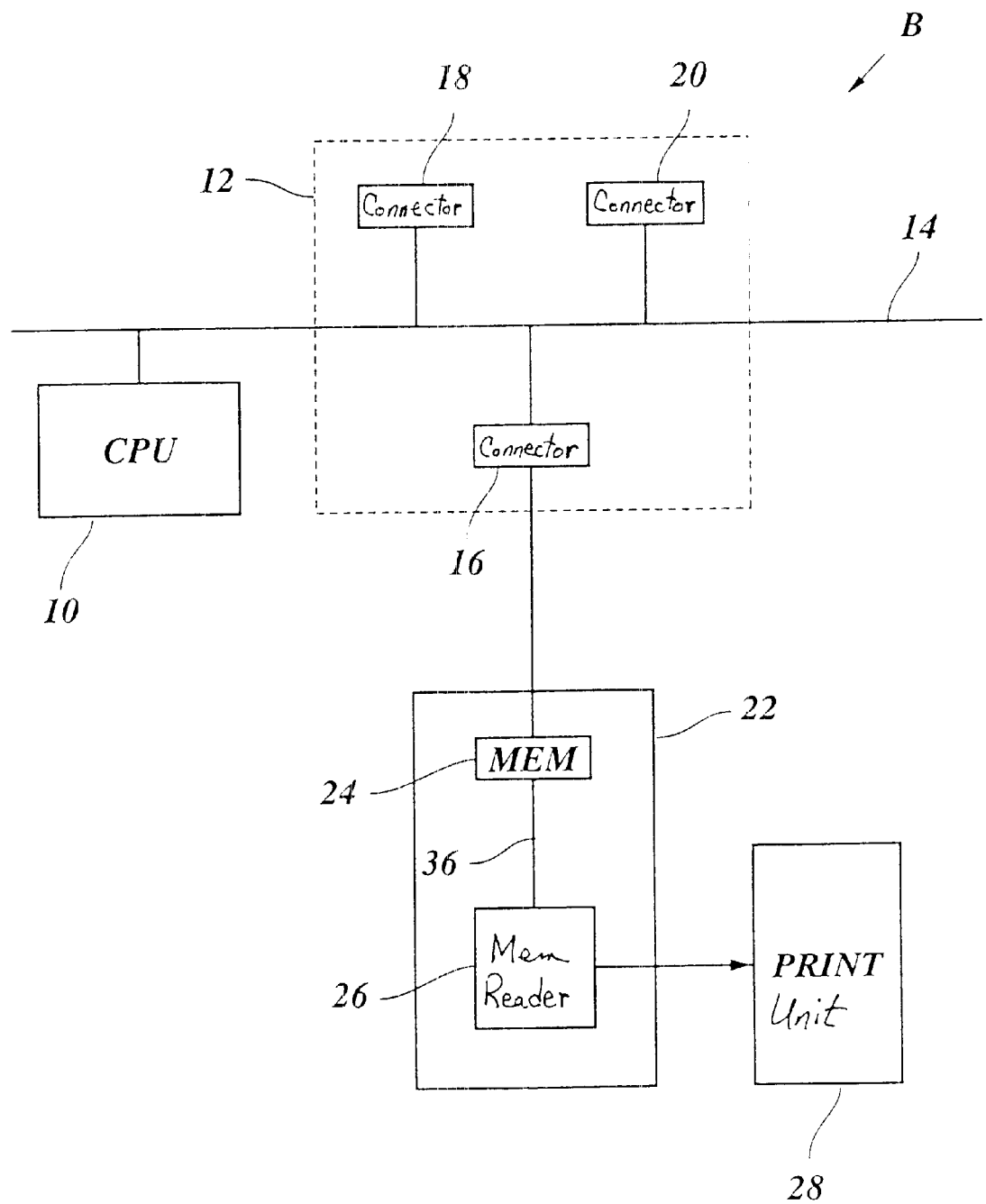
FIG. 1 is a diagram of a controller for a printing unit according to the invention.

A preferred embodiment of the invention will now be described in conjunction with FIG. 1 of the accompanying drawings. In FIG. 1, like reference numerals as in FIGS. 2 and 3 are used for designating like or equivalent parts.

A standard hardware board (or mother board) B comprises the central processing unit 10, the I/O-unit 12 and the central bus system 14. The I/O-unit 12 has the connectors 16, 18 and 20, among which the connector 16 is specifically designed for connecting the memory board 22 having a number of memory chips 24 (SIMMs) mounted thereon.

Figure 2:
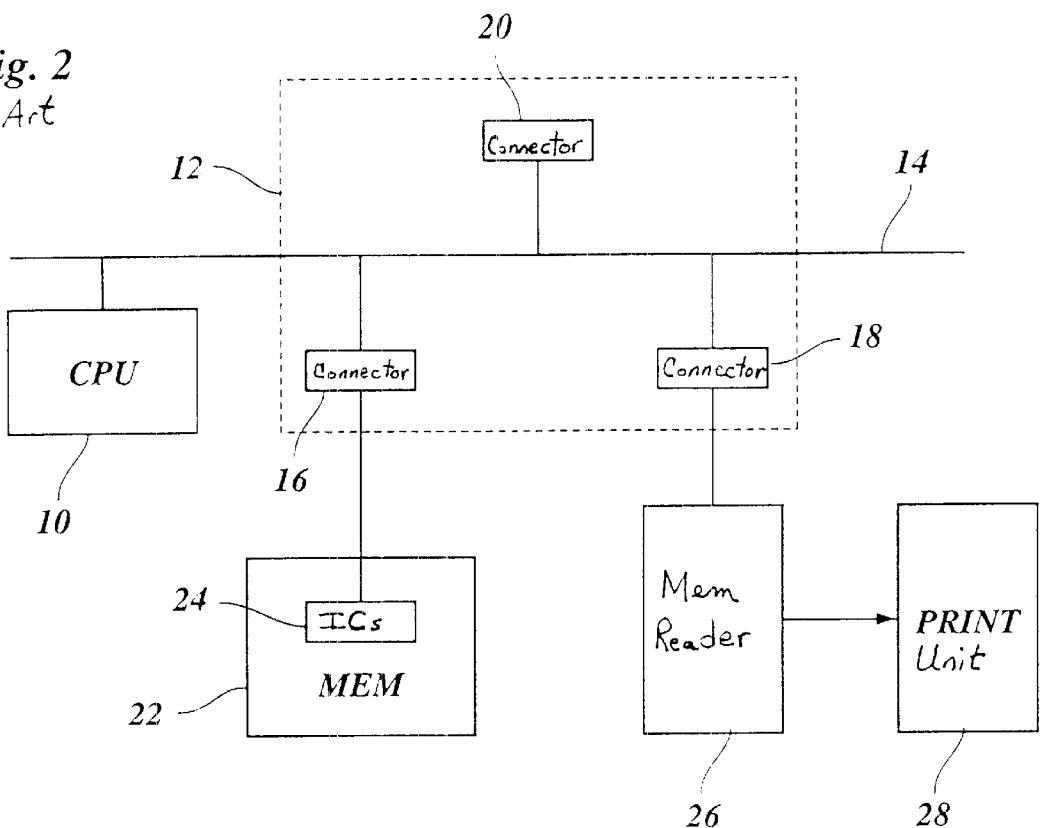
FIGS. 2 and 3 are diagrams illustrating two different prior art controllers.
Figure 3:
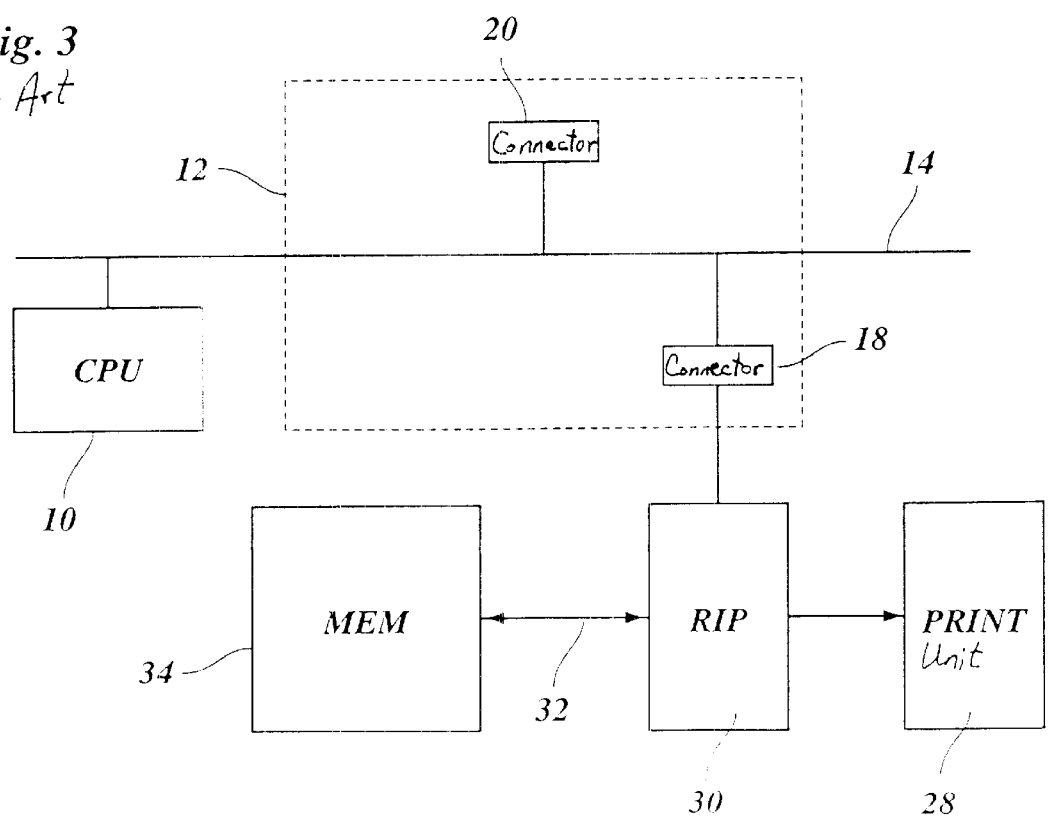

As an important difference in comparison to FIG. 2, the memory board 22 is provided with a second bus system 36 connecting the memory chips 24 to the bitmap reader 26. The bitmap reader 26 is formed by a dedicated hardware logic provided on the memory board 22. Thus, the bitmap reader 26 is no longer connected to any of the connectors of the I/O-unit 12, and the connectors 18 and 20 of the I/O-unit may be used for other purposes, i.e. for connecting a host computer, a keyboard, and the like.

When a page to be printed is to be assembled in the bitmap memory, the data are transmitted via the central bus system 14 and the connector 16 to the memory chips 24 as in the conventional controller shown in FIG. 2. However, when the page-size bitmap has been assembled and the data are to be transmitted to the printer 28, this task is performed by the bitmap reader 26 in FIG. 1 and the second bus system 36, so that the CPU 10 or any peripheral device may have access to the central bus system 14 in order to perform any desired task.

It is further noted that the memory board 22 can also be connected to the CPU 10 via a local- or system-bus system instead of via the I/O-unit 12. Also in this situation during the transmittance of data to the printer by the reader 26 the CPU 10 can perform a different task.

Thus, the invention provides a very efficient print controller which requires only a simple hardware structure and is mainly based on standard hardware components.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A controller for a printing unit, the controller comprising:
   a mother board having
      a central processing unit (CPU),
      a first bus system to which said CPU is directly connected and to which at least one of a user input device, a first memory and an interface to a host computer is directly connected, and
      a non-processing connector arrangement to make a direct connection to said first bus system for devices that are off said mother board without said connector arrangement processing data passing therethrough, a memory board having
      a second memory, different than said first memory, including at least one integrated circuit (I/C) memory chip, directly connected to said first bus system via said connector arrangement, for storing at least one of bitmap data and compressed bitmap data of a page to be printed, and
      a second bus system to which said second memory including said at least one IC memory chip also is directly connected; and
   a reader, connected to said second bus system, for reading at least one of said bitmap data and said compressed bitmap data of said page and for providing the read-data to said printing unit.

2. The controller of claim 1, wherein said reader is provided on said memory board.

3. The controller of claim 1, wherein said IC memory chip is a single in-line memory module (SIMM).

4. A printing system comprising:
   a mother board having
      a central processing unit (CPU), and
      a first bus system to which said CPU directly is connected and to which at least one of a user input device, a first memory and an interface to a host computer is directly connected, and
      a non-processing connector arrangement to make a direct connection to said first bus system for devices that are off said mother board without said connector arrangement processing data passing therethrough;
   a printing unit;
   a memory board having
      a second memory, different than said first memory, including at least one integrated circuit (IC) memory chip, directly connected to said first bus system via said connector arrangement, for storing at least one of bitmap data and compressed bitmap data of a page to be printed, and
      a second bus system to which said second memory including said at least one IC memory chip also is directly connected; and
   a reader, connected to said second bus system, for reading at least one of said bitmap data and said compressed bitmap data of said page and for providing the read-data to said printing unit.

5. The system of claim 4, wherein said reader is provided on said memory board.

6. The system of claim 4, wherein said IC memory chip is a single in-line memory module (SIMM).

7. A controller for a printing unit, the controller comprising:
   a standard hardware board provided with a central processing unit, a non-processing I/O-unit and a central bus system connected to the central processing unit, the non-processing I/O-unit having a connector for directly connecting the central bus system to a memory board without said I/O unit processing data passing therethrough, said memory board having one or more memory chips for storing bitmap data or compressed bitmap data of a page to be printed; and
   a memory reader for reading the data and transmitting said data to a printer;
   wherein the memory board has a second bus system directly connecting the memory chips to the memory reader.

8. The controller according to claim 7, wherein the memory board is a single in-line, memory board.

9. The controller according to claim 7, wherein the memory reader is provided on the memory board.

* * * * *